Oct. 7, 1969  L. A. STEINBERG ET AL  3,471,168

VEHICLE SAFETY APPARATUS

Filed Aug. 27, 1968

INVENTORS
Louis A. Steinberg
Gabriel C. Lotesto

BY

Paul Fields

ATTORNEY

United States Patent Office 3,471,168
Patented Oct. 7, 1969

3,471,168
VEHICLE SAFETY APPARATUS
Louis A. Steinberg, 2932 W. 5th St., Brooklyn, N.Y. 11224, and Gabriel C. Lotesto, 55 Downing St., New York, N.Y. 10014
Filed Aug. 27, 1968, Ser. No. 755,651
Int. Cl. B60v 21/00
U.S. Cl. 280—150                                    13 Claims

ABSTRACT OF THE DISCLOSURE

Vehicle safety apparatus for a vehicle of the type having a wheel connected to a chassis by a pivotable control arm. The apparatus includes a cylinder mounted on the chassis which slidably receives a piston rod having a wheel connected thereto. The piston rod is operable to move from a retracted to an extended position wherein the wheel connected to the piston engages the road to support the vehicle. Connecting means is provided to connect the piston rod with the control arm so that movement of the piston rod to the extended position causes the control arm to pivot upwardly to disengage the vehicle wheel from the road.

---

This invention relates generally to vehicle safety apparatus and, more particularly, pertains to apparatus for enabling a vehicle to proceed safely in the event a wheel becomes disabled.

A great number of automobile road accidents are the direct result of the failure of a wheel to support the vehicle due to any one of a number of reasons such as: wheel bearing failure; failure of the wheel supporting frame per se; a break or crack in any one of the elements forming the wheel suspension system; loss of a wheel due to a faulty kingpin; or a blowout or puncture of a tire.

More particularly, if an automobile is traveling at high speed on a highway, there is a great likelihood that the driver will lose control of the car if a wheel becomes disabled. As a result, serious accidents normally follow involving both property damage and personal injury. If the driver can bring the automobile to a stop safely, a problem still arises if he attempts to fix the wheel on the road (assuming, of course, that he can repair the wheel) since he creates a hazardous condition for both himself and the other automobiles on the road. On the other hand, if the driver attempts to drive his disabled automobile to a safety zone or a repair station, he runs the risk of ruining the wheel and/or the suspension system, and will experience great difficulty in controlling the car.

Accordingly, an object of the present invention is to provide improved vehicle safety apparatus which is operable to permit safe movement of the vehicle in the event a wheel is disabled.

Another object of the invention is to provide safety apparatus including a jack for a vehicle which is operable from the dashboard of the vehicle to raise the disabled wheel.

A further object and feature of the present invention resides in the novel details of construction which provide safety apparatus of the type described which is operable to support the end of an axle connected to a disabled wheel and simultaneously to raise the disabled wheel so that it will not interfere with the operation of the vehicle.

A further object of the invention is to provide apparatus of the type described which is reliable in operation and compatible for use with existing vehicles.

Accordingly, a vehicle safety apparatus constructed in accordance with the present invention is adapted to be used in conjunction with a vehicle of the type having a wheel connected to a chassis by a pivotable control arm. The apparatus includes a ground-engaging member including a cylinder adapted to be mounted on the chassis, and a piston rod in the cylinder operable from a retracted to an extended position. A wheel is connected to the end of the piston rod. Connecting means connects the ground-engaging member with the control arm so that movement of the piston rod to the extended position causes upward pivoting of the control arm to raise the vehicle wheel. Operating means is provided for operating the piston rod to the extended position.

Oter features and advantages of the invention will become more apparent from a consideration of the following detailed description when taken in conjunction with the accompanying drawing, in which.

Figure 3:
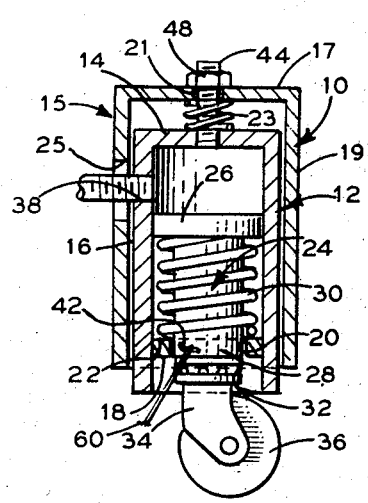
FIG. 3 is a sectional view of the ground-engaging member portion of the apparatus.

The vehicle safety apparatus of the present invention is described in conjunction with a conventional automobile. However, it is to be noted that this is by way of illustration only and is not to be interpreted as being a limitation of the present invention. That is, the apparatus under consideration is adapted to be utilized with any type of wheeled vehicle, such as trucks, trailers and the like. Accordingly, the vehicle safety apparatus of the present invention includes ground-engaging or support members designated generally by the reference numeral 10, each one of which is adapted to be located adjacent a wheel of an automobile A. Since the members 10 are substantially identical in construction, only one member will be described in detail. As shown in FIG. 3, the member 10 includes a hollow piston cylinder 12 having a closed top wall 14, a peripheral wall 16, and a bottom wall 18 having a centrally located opening 20 therein. The diameter of the opening 20 is smaller than the diameter of the interior of the cylinder so that the upper surface of the bottom wall forms a shoulder or shelf 22.

Slidably received in the cylinder 12 is a piston rod or piston 24. The piston 24 is provided with an enlarged head 26 which slidably engages the interior of the wall 16, and a depending portion 28 which is in slidable engagement with the wall defining the opening 20 in the bottom wall 18. Received within the cylinder 12, between the piston head 26 and the shoulder 22, is a spring 30 which exerts an upward biasing force on the piston 24 to bias the piston to a retracted position wherein the portion 28 is received within the cylinder 12. Connected to the bottom of the piston 24 by a swivel mechanism 32 is a bracket 34. The bracket 34 rotatably supports a wheel 36. The swivel mechanism 32 permits the wheel 36 to rotate about an axis coaxial with the piston 24. Alternatively, the axis of the swivel mechanism may be offset with respect to the axis of the piston 24.

Provided in the peripheral wall 16, adjacent the upper or top wall 14, is a through bore 38. Sealingly engaged in the bore 38 is a conduit which connects the cylinder 12 to a source of fluid under pressure, as noted below. The conduit communicates with the hollow interior of the cylinder 12 so that a pressurized fluid can flow through the conduit into the cylinder 12 to move the piston 24 to an extended position against the bias of the spring 30. It is to be understood that appropriate sealing means is provided to prevent the fluid from leaking out of the cylinder. Extending radially outwardly from the piston is an arm 42 which is located adjacent the bottom thereof. The purpose of the arm 42 will become apparent from a consideration of the description below.

The cylinder 12 is adapted to be received in a hollow housing designated generally by the reference numeral 15. More particularly, the housing 15 includes a top wall 17 and a depending peripheral wall 19 having an open bottom which receives the cylinder 12. Upstanding from the top wall 14 of the cylinder 12 is a threaded shaft 44 which extends through a centrally located bore 21 in the top wall 17 of the housing 15. A nut 48 threadedly engages the shaft 44 to connect the housing 15 and the cylinder 12 together. Additionally, an opening 25 is provided in the wall 19 through which the conduit for the cylinder 12 passes.

Figure 1:
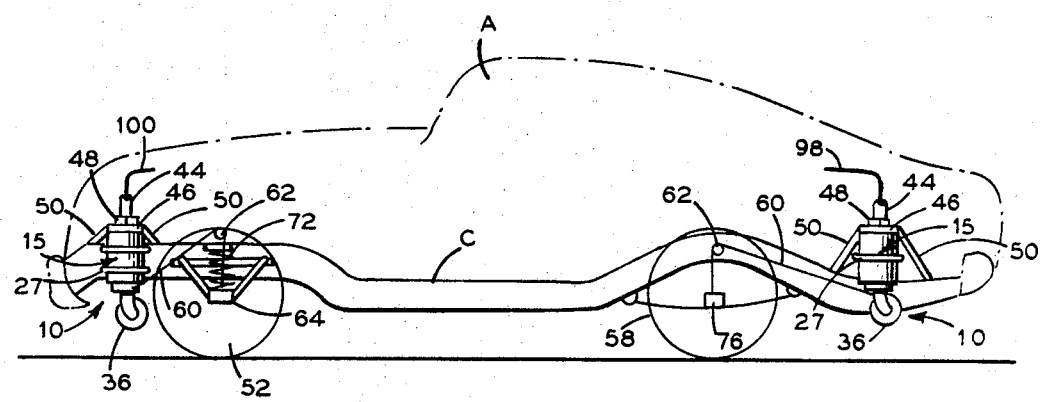
FIG. 1 is a side elevational view of an automobile, with a section removed, having safety apparatus constructed in accordance with the present invention connected thereto.

As shown in FIG. 3, the inner diameter of the housing 15 is greater than the outer diameter of the cylinder 12 so that the cylinder will slide easily into the housing without binding, even if the elements expand due to increased temperatures. Additionally, the top wall 14 of the cylinder 12 is spaced from the top wall 17 of the housing A and a spring 23 is received therebetween which surrounds the shaft 44. The spring 23 is adapted to absorb shocks and the like. As shown in FIG. 1, the housings 15 are rigidly connected to the chassis C by connecting means such as U-bolts 27 and/or supporting struts 46 and 50.

Figure 2:
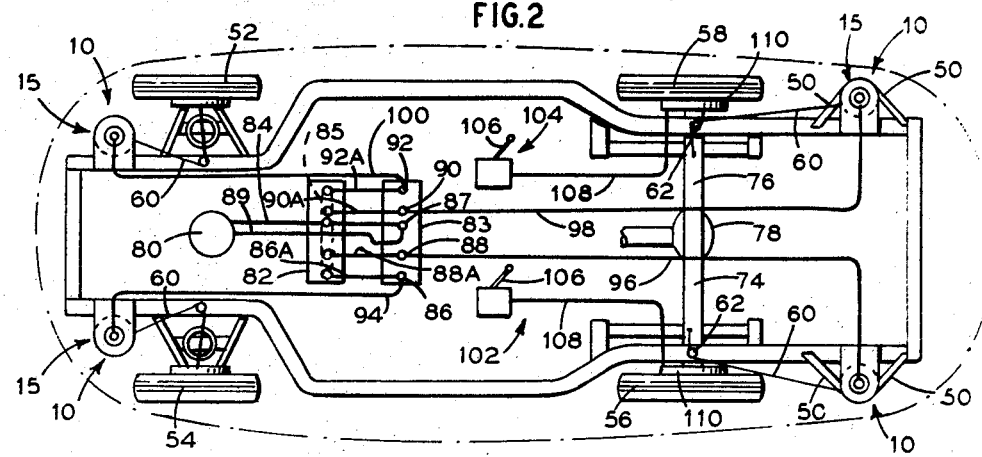
FIG. 2 is a top plan view of an automobile chassis diagrammatically illustrating the valve connection portion of the apparatus of the invention.

As shown in FIGS. 1 and 2 and as noted above, the safety apparatus of the present invention includes a ground-engaging member 10 for each one of the wheels 52, 54, 56 and 58 of the automobile A. More specifically, a respective cylinder 12 is positioned in front of each front wheel 52 and 54; and a respective cylinder 12 is positioned to the rear of each rear wheel 56 and 58. However, it is to be noted that the locations of the respective cylinders 12 is by way of example only and is not to be interpreted as being a limitation of the present invention. That is, the cylinders may be mounted on the chassis C to the rear of the front wheel or in front of the rear wheels or any combination of the above. The only requirement of the invention is that the cylinder be located adjacent the wheel with which it is associated.

Figure 4:
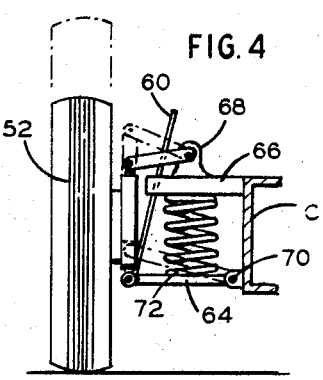
FIG. 4 is a front elevation of the front wheel of an automobile utilizing apparatus constructed according to the present invention.

A cable 60 (FIG. 1) extends from the arm 42 of the member 10 adjacent the wheel 52, about a pulley 62 rotatably mounted on the chassis C, to a lower control arm 64 which connects the wheel 52 with the chassis. To be more specific, the front wheel suspension system of the automobile A includes an extending portion 66 of the chassis C (FIG. 4). An upper link or control arm 68 is pivotally connected to the portion 66 and the lower control arm 64 is connected to the chassis C by a pivot connection 70. It is to be noted that in present day vehicle constructions, the upper and lower control arms 68 and 64 are referred to as the upper and lower A-frame members. However, the present invention includes any type of pivotable connection between the wheel and the chassis C. A heavy suspension coil spring 72 is secured, under compression, between the portion 66 and the control arm 64 and exerts a downward biasing force on the arm 64 to maintain the wheel 52 in contact with the ground or road. The cable 60 extends downwardly through the extension 66 to the front of the control arm 64 and is secured thereto by any conventional means to obtain a greater leaverage.

When the member 10 associated with the wheel 52 is operated, the piston rod 24 moves to the extended position thereby causing the cable 60 to exert an upward force on the control arm 64 of the wheel 52. Thus, the arm will pivot upwardly about the connection 70 to lift the wheel 52 out of engagement with the road, as shown by the dashed line position of FIG. 4.

The wheel 54 is connected to the chassis in a manner similar to that described above and, accordingly, a cable 60 similarly connects the control arm associated with the wheel 54 to the piston of the member 10 mounted on the chassis adjacent this wheel.

Similar to the construction of most automobiles, the rear wheels 56 and 58 of the automobile A are connected to the ends of respective axles 74 and 76. The other ends of the axles 74 and 76 are connected to a differential 78 which supplies driving power to the axles from the drive shaft (not shown) of the vehicle. While the rear wheels are not connected to the chassis via a pivoted connection of the type connecting the front wheels to the chassis, nonetheless, as is conventioned in present-day automobile construction, the rear wheels may be moved upwardly a small distance against the bias of the rear suspension springs (not shown) and the rear shock absorbers. Thus, as shown in FIGS. 1 and 2, cables 60 likewise are provided which connect the respective rear axles 74 and 76 with the members 10 associated with the respective wheels. Similarly to the construction associated with the front wheels, pulleys 62 are rotatably mounted on the chassis adjacent the rear wheels and the cables 60 extend thereabout so that when the pistons are moved to the extended position, the respective rear wheels will move upwardly.

In many applications it may not be desirable to connect the rear driving wheel with the associated ground-engaging member 10. In these cases the cable 60 may be dispensed with. Moreover, in the illustrative example under consideration, it has been assumed that the automobile A has a so-called rear wheel drive. However, if a vehicle has a front wheel drive the connections between the respective wheels and the associated members may be reversed. Moreover, since the rear wheels do not turn in response to a movement of the steering wheel, the swivel mechanism associated with the rear member 10 may be eliminated.

The respective ground-engaging members 10 are adapted to be selectively and individually operated by a source of fluid under pressure. In the present apparatus, the source of fluid is the power steering pump. However, it is emphasized that this is for illustrative purposes only as the source may comprise a separate unit entirely, such as a tank of compressed air or the like.

As shown in FIG. 2, a pump 80 (which may be the power steering pump, as noted above) is connected to a distribution block 82 by a feed conduit 84. A valve block 83 is adapted to be mounted on the dashboard of the vehicle or a similar accessible place. The conduit 84 communicates with a channel 85 in the distribution block 82. The channel 85 is connected to individually and selectively operable valves 86, 88, 90 and 92 in the valve block 83 by respective conduits 86A, 88A 90A and 92A. The valves 86–92 normally are closed. Additionally, the channel 85 is connected to a normally open valve 87 in the valve block 83 by the conduit 84. The valve 87, in turn, is connected back to the pump 80 via a return conduit 89. The valve 86 is operable to connect the channel 85 with the member 10 associated with the wheel 54 via a conduit 94; the valve 88 is operable to connect the channel 85 with the member 10 associated with the wheel 56 via a conduit 96; the valve 90 is operable to connect the channel 85 with the member 10 associated with the wheel 58 via a conduit 98; and the valve 92 is operable to connect the channel 85 with the member 10 associated with the wheel 52. All the valves 87–92 are positioned on the valve block 83 so that they may be operated easily by the driver of the vehicle.

In operation, the ground-engaging members 10 are positioned as shown. The valve 87 is normally open and the valves 86, 88, 90 and 92 are normally closed. Accordingly, fluid circulates under pressure from the pump 80 to the channel 85 via the conduit 84 and back to the pump 80 through the open valve 87 and the conduit 89. Assuming that the wheel or tire 54 is disabled, as by a blowout or the like, the driver closes valve 87 thereby preventing the pressurized fluid from returning to the pump via the conduit 89. Simultaneously with the operation of the valve 87, the driver operates the valve 86 to the open position.

Accordingly, the pressurized fluid now flows to the member 10 associated with the wheel 54 via the circuit including the pump 80, conduit 84, channel 85 of block 82, conduit 86A, valve 86 and conduit 94 through the bore 38 into the interior of the housing 12. The increased pressure on the head of the piston 24 causes the piston to move to the extended position. As the piston moves downwardly, the connecting cable 60 exerts an upward force on the control arm 64 associated with the wheel 54 thereby to cause the disabled wheel to move upwardly to disengage the wheel from the road.

After the piston has moved a sufficient distance such that the piston wheel 36 is in rolling engagement with the road, the valve 86 is closed. This action entraps the pressurized fluid in the conduit 94 so that the piston is maintained in the operated or extended position. The operated member 10 accordingly supports the automobile and permits the vehicle to continue to move until the driver can remove the automobile to a safe location. As the driver turns the steering mechanism of the vehicle, the front wheel 52 turns in the desired direction. Moreover, as noted above, the member 10 is provided with a swivel mechanism 32 so that the operated member 10 follows the change in direction. Additionally, since the operation of the member 10 raises the wheel 54 off the ground or road, the wheel 54 easily may be repaired after the automobile has been moved to a safe location.

After the disabled wheel 54 has been fixed, the operated member 10 is returned to its normal state wherein the piston is retracted by opening the valve 87 to permit the pressurized fluid to flow back to the pump 80. Additionally, the valve 86 is opened to permit reverse flow of the fluid through the conduit 94. The spring 30 biases the piston 24 back to its original retracted position thereby forcing the fluid back into the channel 85. It should be noted that the opening of the valve 87 substantially decreases the pressure in the channel 85 to permit the spring 30 to effect such movement of the piston 24. Thus, the driver now may operate the vehicle in the normal manner.

If any one of the other wheels is disabled, the member associated with that particular wheel may be operated in a similar manner by operating the valve associated with that member. However, a problem is encountered in operating the members 10 associated with the rear wheels 56 and 58. To be more specific, if a rear wheel such as 56 is disengaged from the ground or road, the wheel will spin freely due to the action of the differential 78. Hence, no power will be applied to the other wheel to drive the automobile. Accordingly, in order to prevent the disengaged wheel from spinning, the apparatus of the present invention further includes respective brakes, designated generally by the reference numerals 102 and 104, which prevent rotation of the rear wheels 56 and 58, respectively. More specifically, the brake 102 includes a lever 106 which is adapted to be mounted on the dashboard of the vehicle. The lever is connected by a cable 108 to a brake mechanism 110 which is adapted to prevent rotation of the wheel 56. The lever 106 includes a ratchet mechanism similar to parking brakes so that the brake 102 easily may be set to the braking state.

The brake 104 is similar in construction to the brake 102 and includes a lever 112 having a releasable ratchet mechanism which is connected to a brake mechanism 114 on the wheel 58 by a cable 116. Thus, when it is desired to operate the member associated with either the wheel 56 or the wheel 58, the corresponding brake 102 or 104 is operated to prevent operation of the particular wheel.

Accordingly, vehicle safety apparatus has been disclosed which is operable to support a vehicle albeit a wheel is disabled and to permit said vehicle to continue moving to eliminate the possibility of loss of control of the vehicle and consequent damage and to permit the vehicle to be moved to a safe area.

While a preferred embodiment of the invention has been shown and described herein it will become apparent that numerous additions, changes and omissions may be made in such embodiment without departing from the spirit and scope of the present invention. For example, although pneumatically operated piston devices have been disclosed it is obvious that electrically operated pistons may be utilized.

What is claimed is:

1. Vehicle safety apparatus for a vehicle of the type having at least a vehicle wheel connected to a chassis by a pivotable control arm; said apparatus comprising a ground-engaging member including a cylinder adapted to be mounted on the vehicle chassis, a piston in said cylinder operable from a retracted to an extended position, a rotatable piston wheel connected to the end of said piston, connecting means for connecting said member with the control arm so that the control arm is pivoted upwardly when said piston rod is moved to the extended position, and operating means for operating said piston from the retracted to the extended position.

2. Vehicle safety apparatus as in claim 1, and biasing means for biasing said piston to the retracted position.

3. Vehicle safety apparatus as in claim 1, in which said connection means includes a cable connected at one end to said piston and at the other end to said control arm, a direction changing member adapted to be mounted on the chassis, said cable being positioned upwardly from said piston rod, about said direction changing member, and downwardly to said control arm.

4. Vehicle safety apparatus as in claim 3, in which said direction changing member comprises a pulley adapted to be rotatably mounted on the chassis, said cable being positioned about said pulley and being connected to the end of said control arm remote from said pivotable connection.

5. Vehicle safety apparatus as in claim 1, in which said operating means comprises a source of fluid under pressure, valve means adapted to be mounted on the dashboard of the vehicle for selectively connecting said source of fluid with said cylinder to operate said piston to the extended position.

6. Vehicle safety apparatus as in claim 1, in which said ground-engaging member further includes swivel means for connecting said piston wheel to said piston so that said wheel is rotatable with respect to said piston.

7. Vehicle safety apparatus as in claim 1, and a housing receiving said cylinder therein, connecting means for resiliently connecting said cylinder with said housing, and mounting means for mounting said housing on the chassis of the vehicle.

8. Vehicle safety apparatus for a vehicle of the type having wheels rotatable about respective axle members, said safety apparatus including a ground-engaging member adjacent each vehicle wheel, each ground-engaging member comprising a cylinder, a piston in each cylinder movable from a retracted to an extended position, a piston wheel connected to each piston and positioned to engage the ground when the associated piston is moved to the extended position, connecting means for connecting each axle member with the associated ground-engaging member so that said axle member is moved upwardly when the associated piston is operated to the extended position, and control means for selectively and individually operating each ground-engaging member.

9. Vehicle safety apparatus as in claim 8, and biasing means in each of said cylinders for biasing the associated piston to the retracted position.

10. Vehicle safety apparatus as in claim 8, in which said control means comprises a source of fluid under pressure, and individually operable valve means for selectively connecting said ground-engaging members with said source of fluid to move a selected one of said pistons to the extended position.

11. Vehicle safety apparatus as in claim 10, in which said valve means includes a valve block connected to said source of fluid, said valve block including a respective valve control for each one of said members, a plurality of conduits equal in number to the number of ground-engaging members connecting a different one of said valve controls to respective ones of said ground-engaging members, and a valve controlled recirculation conduit connecting said valve block with said source of fluid to provide for the recirculation of said fluid.

12. Vehicle safety apparatus as in claim 11, in which said connecting means comprises a cable connected between the piston of the ground-engaging member and the axle of the associated vehicle wheel whereby movement of the piston to the extended position causes upward movement of the axle connected thereto.

13. Vehicle safety apparatus as in claim 8, and brake means adapted to be connected with the driven wheels of the vehicle and being operable to prevent rotation of a driven wheel when the ground-engaging member associated with that wheel is operated.

References Cited
UNITED STATES PATENTS

| 2,452,110 | 10/1948 | Dourte | 280—150 |
| 2,478,653 | 8/1949 | Callan | 280—150 |

BENJAMIN HERSH, Primary Examiner

ROBERT R. SONG, Assistant Examiner

U.S. Cl. X.R.

280—150.5